(12) United States Patent
Russ et al.

(10) Patent No.: US 8,976,496 B2
(45) Date of Patent: Mar. 10, 2015

(54) ELECTROSTATIC DISCHARGE BLOCKING CIRCUITS

(75) Inventors: Christian Russ, Diedorf (DE); Wolfgang Soldner, Unterhaching (DE); Gernot Langguth, Oberhaching (DE); David Alvarez, Munich (DE); Krzysztof Domanski, Munich (DE); Klaus von Arnim, Munich (DE)

(73) Assignee: Infineon Technologies AG, Neubiberg (DE)

( * ) Notice: Subject to any disclaimer, the term of this patent is extended or adjusted under 35 U.S.C. 154(b) by 4 days.

(21) Appl. No.: 12/975,069

(22) Filed: Dec. 21, 2010

(65) Prior Publication Data
US 2012/0154961 A1 Jun. 21, 2012

(51) Int. Cl.
*H02H 9/04* (2006.01)
*H02H 3/22* (2006.01)
*H02H 3/20* (2006.01)

(52) U.S. Cl.
CPC ............... *H02H 9/046* (2013.01); *H02H 3/202* (2013.01); *H02H 3/22* (2013.01)
USPC ............................................. 361/56; 361/91.1

(58) Field of Classification Search
CPC ........... H02H 3/22; H02H 3/202; H02H 9/04; H02H 9/046
USPC ................................................ 361/56, 91.1
See application file for complete search history.

(56) References Cited

U.S. PATENT DOCUMENTS

| 5,610,791 | A | * | 3/1997 | Voldman ......................... 361/56 |
| 6,002,568 | A | * | 12/1999 | Ker et al. ....................... 361/111 |
| 6,011,681 | A | * | 1/2000 | Ker et al. ....................... 361/111 |
| 6,947,267 | B2 | * | 9/2005 | Liu et al. ......................... 361/56 |
| 7,233,467 | B2 | | 6/2007 | Mergens et al. |
| 7,382,177 | B2 | * | 6/2008 | Cordoba et al. ............... 327/536 |
| 7,848,068 | B2 | * | 12/2010 | Chen et al. ....................... 361/56 |
| 2009/0057768 | A1 | | 3/2009 | Chen |
| 2009/0168280 | A1 | | 7/2009 | Huang et al. |
| 2010/0073833 | A1 | | 3/2010 | Hong et al. |
| 2011/0063763 | A1 | | 3/2011 | Alvarez et al. |

* cited by examiner

*Primary Examiner* — Zeev V Kitov
(74) *Attorney, Agent, or Firm* — SpryIP, LLC (57) ABSTRACT

Techniques and architectures corresponding to electrostatic discharge blocking circuits are described.

28 Claims, 7 Drawing Sheets

ELECTROSTATIC DISCHARGE BLOCKING CIRCUITS

BACKGROUND

Electrostatic discharge events that occur via a semiconductor chip may cause voltage increases that damage components of functional circuit blocks on the semiconductor chip. In some cases, the components may become nonfunctional when subject to a voltage spike that occurs during an electrostatic discharge event.

In a particular situation, metal oxide semiconductor (MOS) transistors may be included in interface circuits that are located between functional circuit blocks of a semiconductor chip. For example, the interface circuits may include buffer circuits that amplify the signal for a functional circuit block receiving a signal from another functional circuit block. In some cases, the different functional circuit blocks may be supplied by different power domains. That is, the positive and negative supply voltages provided to one functional circuit block may be provided by different sources than the positive and negative supply voltages provided to another functional circuit block. In some cases, the buffer circuits include MOS transistors with ultra thin gate dielectrics that may be particularly sensitive to damage during an electrostatic discharge event due to the voltage differences that can occur between the different power domains of the semiconductor chip. In some instances, clamping circuits may be coupled to the buffer circuits in order to prevent the voltage at the gates of the buffer circuit transistors from exceeding a specified value during an electrostatic discharge event.

The functional circuit blocks of an integrated circuit may also be coupled to supply voltages by a micro switch (also referred to as a "power switch"). The micro switches may be MOS transistors that temporarily switch off either the positive supply voltage or the negative supply voltage in order to decrease power consumption. In some scenarios, the clamping circuits coupled to the buffer circuits to mitigate the effects of electrostatic discharge events may be incompatible with these micro switches. To illustrate, when the micro switch is turned off and the semiconductor chip is not powered, leakage current in the functional circuit block coupled to the interface circuit may cause either the voltage at the internal positive line or the negative supply line to float or drift toward the opposite potential (i.e. the voltage of the internal positive supply line may drift toward the voltage of the negative supply voltage or the voltage of the internal negative supply line may drift toward the voltage of the positive supply voltage). The drifting of one of the supply line voltages may activate transistors of a clamping circuit included in the interface circuit and cause the leakage current to flow to other parts of the semiconductor chip, which leads to an increase in power consumption. In some instances, the current may occur between differing power domains and cause malfunction of a buffer circuit included in the interface circuit.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different instances in the description and the figures may indicate similar or identical items.

DETAILED DESCRIPTION

This disclosure describes an interface circuit that includes an electrostatic discharge (ESD) protection circuit. The interface circuit includes a circuit arrangement that comprises a p-channel metal oxide semiconductor (PMOS) buffer transistor configured to receive an input signal from a first functional circuit block at a gate of the PMOS buffer transistor. The PMOS buffer transistor may also be configured to provide a first portion of an output signal to a second functional circuit block. The circuit arrangement also includes a n-channel metal oxide semiconductor (NMOS) buffer transistor configured to receive the input signal from the first functional circuit block at a gate of the NMOS buffer transistor and configured to provide a second portion of the output signal to the second functional block. A drain of the NMOS buffer transistor is coupled to a drain of the PMOS buffer transistor.

In addition, the circuit arrangement includes a PMOS blocking transistor. A drain of the PMOS blocking transistor is coupled to a source of the PMOS buffer transistor and a gate of the PMOS blocking transistor is coupled to a negative supply voltage. Further, the circuit arrangement includes an NMOS blocking transistor. A drain of the NMOS blocking transistor is coupled to a source of the NMOS buffer transistor and a gate of the NMOS blocking transistor is coupled to a positive supply voltage.

During an ESD event, such as a voltage spike between an output node of the first functional circuit block and the negative supply voltage, the circuit arrangement is configured such that the NMOS blocking transistor is in an off mode and a voltage divider is formed between the NMOS buffer transistor and the NMOS blocking transistor. Thus, the gate of the NMOS buffer transistor is protected from the voltage spike produced during the ESD event because the voltage divider functions to reduce the voltage at the gate of the NMOS buffer transistor.

In addition, during an ESD stress between an output node of the first functional circuit block and a positive supply voltage, the circuit arrangement is configured such that the PMOS blocking transistor is in an off mode and a voltage divider is formed between the PMOS buffer transistor and the PMOS blocking transistor. By reducing the voltage at the gate of the PMOS buffer transistor, the voltage divider functions to protect the gate of the PMOS buffer transistor during the ESD event.

Furthermore, the circuit arrangement is compatible with micro switches that may be utilized to couple the functional circuit block including the interface circuit to an external negative supply voltage or an external positive supply voltage. In particular, the circuit arrangement operates to reduce leakage current through the functional circuit block by turning off each transistor of the functional circuit block when a micro switch coupled to either the positive supply voltage or the negative supply voltage is opened. Thus, the circuit arrangement minimizes power consumption of the functional circuit block when the functional circuit block is not in operation.

Figure 1:
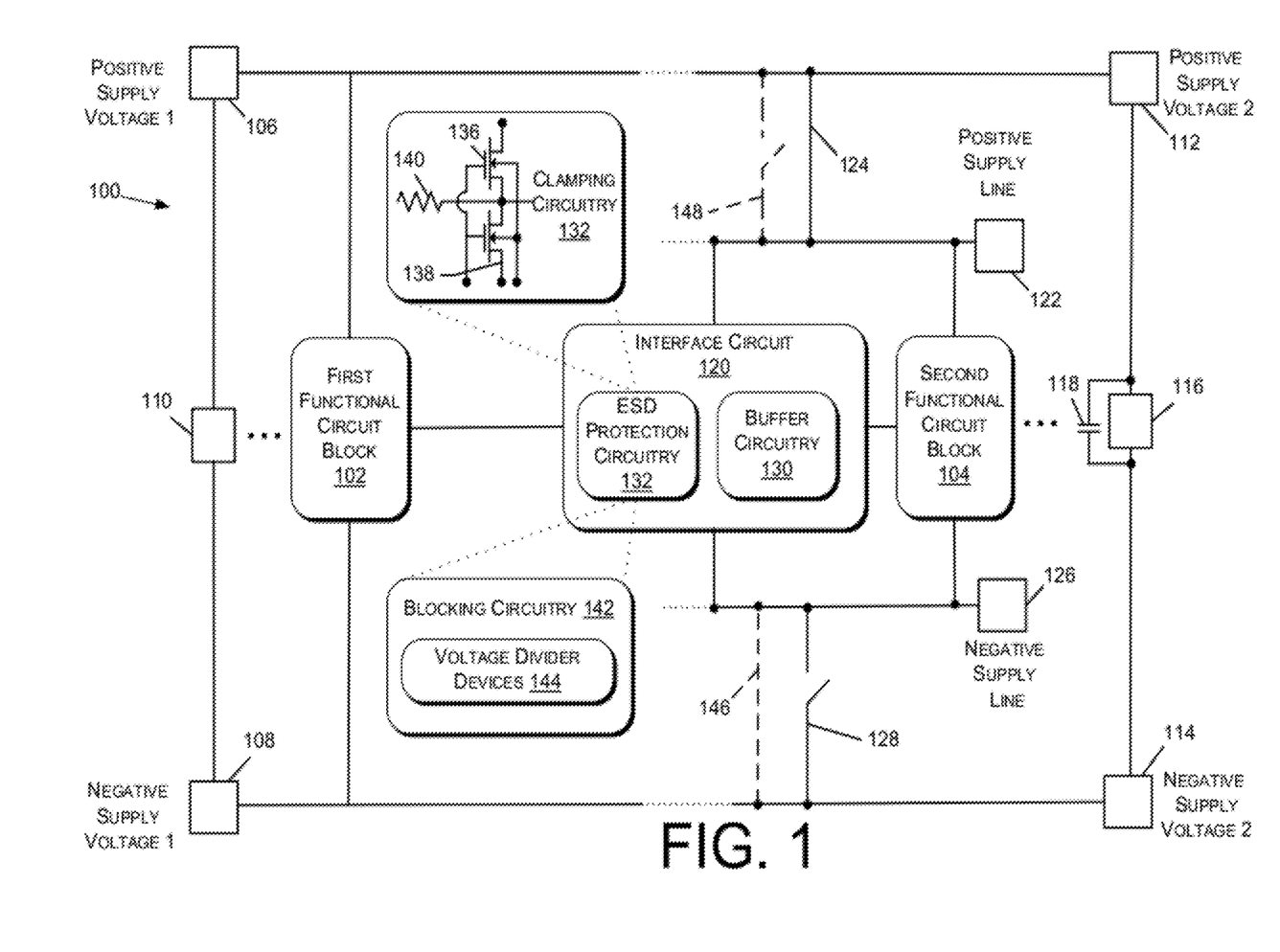
FIG. 1 is a schematic diagram of a system including an interface circuit coupled between functional circuit blocks of a semiconductor chip, where the interface circuit includes an electrostatic discharge protection circuit.

FIG. 1 is a schematic diagram of a system 100 including an interface circuit coupled between functional circuit blocks of a semiconductor chip, where the interface circuit includes electrostatic discharge protection circuitry. The system 100 includes a first functional circuit block 102 and a second functional circuit block 104. The functional circuit blocks 102, 104 may include logic to perform operations of a semiconductor chip included in a particular computing device, such as a personal computer, a laptop computer, a netbook computer, a personal digital assistant (PDA), a portable gaming device, a wireless communication device (e.g., a smart phone, a mobile handset, etc.), a set-top box, a game console, a portable music player, a router, a household appliance, a personal item (e.g., a wristwatch, calculator, etc.), other network connected devices, and so forth. In the illustrative embodiment shown in FIG. 1, the first functional circuit block 102 may serve as a signal transmitter or driver for the second functional circuit block 104, which serves as a signal receiver.

The first functional circuit block 102 may be coupled to a first positive supply voltage via a connector 106, such as a pad, a pin, and the like. The first functional circuit block 102 may also be coupled to a first negative supply voltage, such as ground, via a connector 108. The first positive supply voltage and the first negative supply voltage may provide potential to components of the first functional circuit block 102. For example, the first positive supply voltage may be utilized to drive PMOS transistors of the first functional circuit block 102, while the negative supply voltage may be utilized to drive NMOS transistors of the first functional circuit block 102. The first positive supply voltage and the first negative supply voltage may be provided by external off-chip sources. In some cases, clamping circuitry 110 may be coupled between the connector 106 and the connector 108 to provide ESD protection between the first positive supply voltage and the second positive supply voltage. The clamping circuitry 110 may include one or more MOS transistors, one or more bipolar transistors, one more silicon controlled rectifiers (SCRs), one or more diodes, one or more capacitors, or a combination thereof.

Additionally, the second functional circuit block 104 may be coupled to a second positive supply voltage via a connector 112 and to a second negative supply voltage, such as ground, via a connector 114. The second positive supply voltage and the second negative supply voltage may provide potential to components of the second functional circuit block 104. Clamping circuitry 116 may be coupled between the connectors 112 and 114 to provide ESD protection between the second positive supply voltage and the second negative supply voltage. Additionally, capacitive circuitry represented by the capacitor 118 in FIG. 1, may be coupled to the input and output nodes of the clamping circuitry. In some cases, merely the capacitive circuitry 118 may be coupled between the second positive supply voltage and the second negative supply voltage.

The system 100 also includes an interface circuit 120 coupled between the first functional circuit block 102 and the second functional circuit block 104. The interface circuit 120 is coupled to a positive supply line via a connector 122. The positive supply line may serve as a local positive supply voltage to the interface circuit 120. In some instances, the source of the positive supply line may be the second positive supply voltage. The interface circuit 120 may also be coupled to the second positive supply voltage via a connector 124, which is coupled to the connector 112.

Additionally, the interface circuit 120 is coupled to a negative supply line via a connector 126. The negative supply line may serve as a local negative supply voltage to the interface circuit 120. In some cases, the source of the negative supply line may be the second negative supply voltage.

In some cases, the first positive supply voltage and positive supply line and/or the first negative supply voltage and the negative supply line may be part of the same power domain. That is, the first positive supply voltage and the positive supply line and/or the first negative supply voltage and the negative supply line may be distributed on the chip by the same conductive network. For example, the first negative supply voltage and the negative supply line may both be coupled to ground. In other cases, the first positive supply voltage and the positive supply line and/or the first negative supply voltage and the negative supply line may be associated with different power domains. To illustrate, the first positive supply voltage and the voltage at the positive supply line may be provided by different conductive networks to the components of the first functional circuit block 102 and the second functional circuit block 104, respectively.

The interface circuit 120 is also coupled to the connector 114 via a switch 128. Although the switch 128 is shown in FIG. 1 as a generic switch, the switch 128 may include any form of a switch, including one or more MOS transistors. The switch 128 may be closed to provide the second negative supply voltage to the interface circuit 120 and turn on the second functional circuit block 104. Additionally, the switch 128 may be opened in order to turn off the second functional circuit block 104 and save power with respect to a computing device that includes the system 100.

The interface circuit 120 may include buffer circuitry 130 and ESD protection circuitry 132. The buffer circuitry 130 may include components, such as MOS transistors, that buffer and amplify the signals from the first functional circuit block 102. Additionally, the ESD protection circuitry 132 includes components, such as MOS transistors, to provide protection to the components of the buffer circuitry 130 in the event of an ESD stress in the system 100, such as a positive ESD stress or a negative ESD stress. In particular, the ESD protection circuitry 132 may reduce the impact of an ESD stress on the components of the buffer circuitry 130 by reducing the voltage experienced at the gates of MOS transistors of the buffer circuitry 130 during the ESD stress.

In some scenarios, the ESD protection circuitry 132 may include clamping circuitry 134. In an illustrative embodiment, the clamping circuitry 134 may include a first NMOS clamping transistor 136 and a second NMOS clamping transistor 138. A source of the first NMOS clamping transistor 136 is coupled to a drain of the second NMOS clamping transistor 138, while a drain of the first NMOS clamping transistor 136 is coupled to a positive supply voltage via the positive supply line. Additionally, a source of the second NMOS clamping transistor 132 is coupled to a negative supply voltage via the negative supply line. The gates of the first and second NMOS clamping transistors 136, 138 may be coupled to each other and to a negative supply voltage via the negative supply line. Further, the body terminals of the first and second NMOS clamping transistors 136, 138 may be coupled to each other and to a negative supply voltage via the negative supply line. The source of the first NMOS clamping transistor 136 and the drain of the second NMOS clamping transistor 138 may be coupled to an input signal line carrying a signal from the first functional circuit block 102 to the second functional circuit block 104. The input signal line may also include an impedance device 140, such as one or more resistors, one or more MOS transistors, and so on. The first and second NMOS clamping transistors 136, 138 and the impedance device 140 may be configured to reduce the voltages at components of the buffer circuitry 130 during an ESD event in order to prevent damage to the buffer circuitry 130.

In some embodiments, where the ESD protection circuitry 132 includes the clamping circuitry 134 and when the switch 128 is opened to turn off the second functional circuit block 104, a leakage current may flow through the second functional circuit block 104. This leakage current may cause the voltage at the negative supply line to float towards the voltage of the positive supply line. Consequently, the first NMOS clamping transistor 136 and the second NMOS clamping transistor 138 may be activated and undesired cross-domain current may flow through the input signal line to the first negative supply voltage. Thus, undesired current may flow across power domains from the positive supply line and the negative supply line to the first negative supply voltage. This current may result in increased power consumption for the system 100 and/or damage to components of the system 100.

In order to reduce or eliminate the current flowing through the clamping circuitry 134, the ESD protection circuitry 132 may include blocking circuitry 142 that is used in place of or in conjunction with the clamping circuitry 134. The blocking circuitry 142 may include one or more voltage divider devices 144. In some cases, the voltage divider devices 144 may include one or more MOS transistors, one or more diodes, or a combination thereof. In a particular embodiment, during an ESD stress event, the voltage divider devices 144 are configured to remain off and are coupled to components of the buffer circuitry 130 to serve as a voltage divider with respect to a voltage applied to the gates of MOS transistors of the buffer circuitry 130. In this way, the voltage divider devices 144 are configured to reduce a voltage produced by an ESD stress at the gates of MOS transistors of the buffer circuitry 130 in order to reduce or prevent damage to the MOS transistors of the buffer circuitry 130.

In addition, the voltage divider devices 144 are configured such that any leakage current through the second functional circuit block 104 does not activate components of the buffer circuitry 130 or the ESD protection circuitry 132. Thus, current does not flow from the second functional circuit block 104 through components of the buffer circuitry 130 and/or components of the ESD protection circuitry 132 to other parts of the system 100 and does not have the opportunity to flow across power domains. Consequently, power consumption of the system 100 may be reduced when the ESD protection circuitry 132 includes the blocking circuitry 142.

In this way, the system 100 can be utilized to protect MOS transistors, particularly NMOS transistors, of a buffer circuit coupled between functional blocks of a semiconductor chip during an ESD stress event. Further, the system 100 is compatible with micro switches, such as the switch 128, and can be utilized to decrease power consumption by limiting leakage current through the system 100 that may otherwise occur when the switch 128 is off. The blocking circuitry 142 may also be arranged to reduce the layout area required for ESD protection and preserve the integrity of the signal provided by the first functional circuit block 102 to the second functional circuit block 104.

In alternative embodiments, the switch 128 may be replaced with a connector 146 and the connector 124 may be replaced with a switch 148. The connector 146 may be utilized to couple the interface circuit 120 to the second negative supply voltage, while the switch 148 may be utilized to couple the interface circuit 120 to the second positive supply voltage. When the system 100 includes the switch 148, the interface circuit 120 operates in a manner complementary to the manner described above in embodiments where the system 100 includes the connector 124 and the switch 128. In particular, the voltage divider devices 144 of the blocking circuitry 142 may be configured to reduce the voltage provided to the gates of MOS transistors of the buffer circuitry 130, particularly PMOS transistors, during an ESD event and thereby protect the MOS transistors of the buffer circuitry 130 from damage during the ESD event. Additionally, the ESD protection circuitry 132 may operate to provide protection during ESD events in the absence of the switch 128 and the switch 148 in the system 100.

Figure 2:
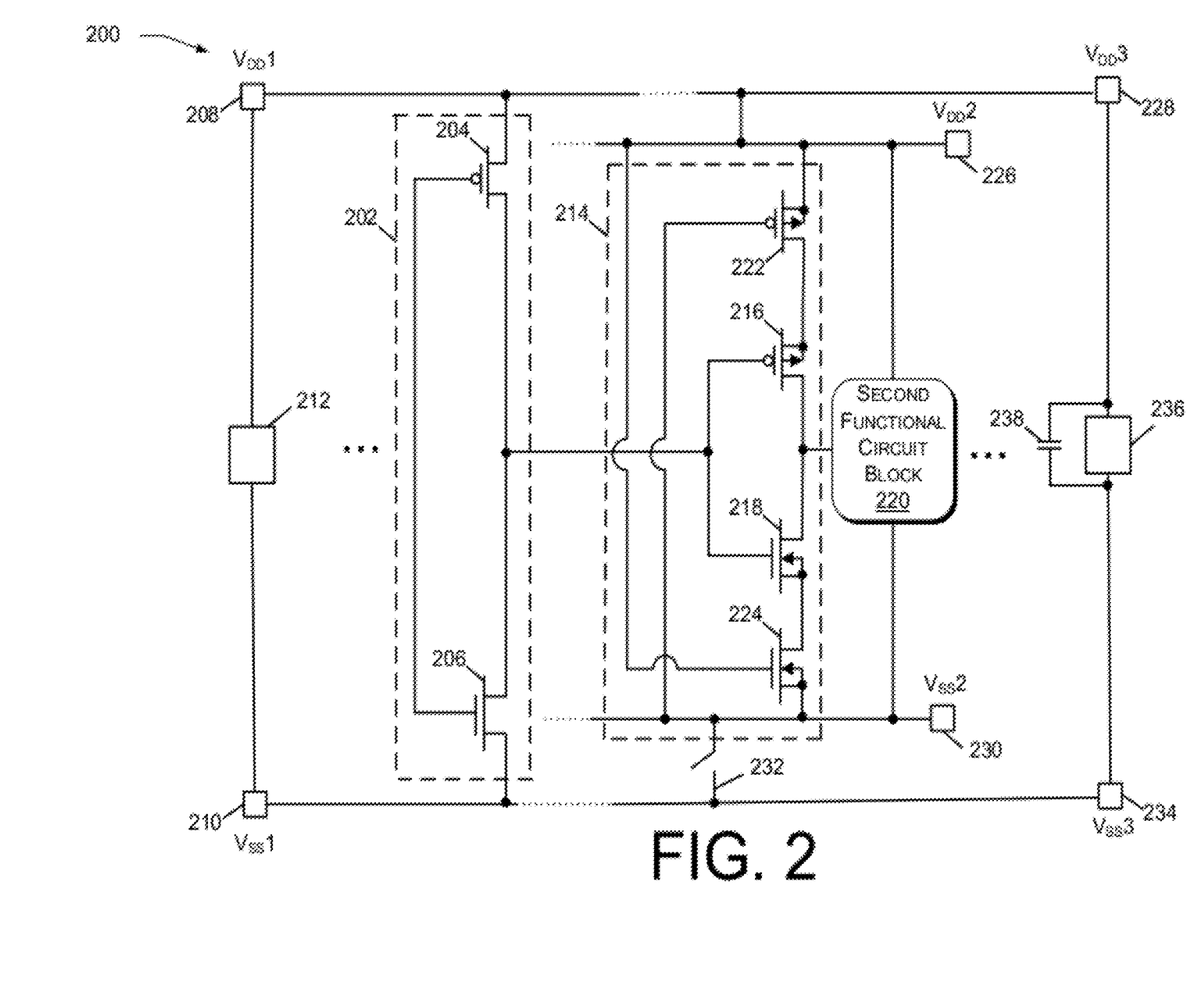
FIG. 2 is a schematic diagram of an architecture including an electrostatic discharge blocking circuit coupled to a buffer circuit that is coupled between functional circuit blocks of a semiconductor chip. The electrostatic discharge blocking circuit is coupled to an external negative supply voltage via a micro switch.

FIG. 2 is a schematic diagram of an architecture 200 that includes electrostatic discharge blocking circuitry coupled to buffer circuitry that is coupled between functional blocks of a semiconductor chip. The architecture 200 includes a first functional circuit block 202. The first functional circuit block 202 may include a number of transistors represented by PMOS transistor 204 and NMOS transistor 206. The first functional circuit block 202 may also include a number of other components, such as one or more impedance devices, one or more capacitors, one or more inductors, one or more switches, one or more diodes, and the like. The components of the first functional circuit block 202 may be arranged in order to perform certain operations for a computing device.

The first functional circuit block 202 may be coupled to a pad, pin, wire, or other suitable connector, 208 that provides a positive supply voltage $V_{DD}1$ to the first functional circuit block 202. $V_{DD}1$ may also be provided to other portions of a semiconductor chip that includes the architecture 200. The first functional circuit block 202 may also be coupled to connector 210 that provides a negative supply voltage $V_{SS}1$ to the first functional circuit block 202. Additionally, a clamping circuit 212 may be coupled between the connectors 208, 210. The clamping circuit 212 can provide protection for $V_{DD}1$ and $V_{SS}1$ during electrostatic discharge events. For example, the clamping circuit 212 may limit any overvoltage that occurs between $V_{DD}1$ and $V_{SS}1$ during an electrostatic discharge event.

The architecture 200 also includes an interface circuit 214 that receives a signal from the first functional circuit block 202 as an input signal. The input signal to the interface circuit 214 may be an analog signal or a digital signal. The interface circuit 214 includes a PMOS buffer transistor 216 and an NMOS buffer transistor 218. The PMOS buffer transistor 216 and the NMOS buffer transistor 218 may operate as buffer circuitry, such as the buffer circuitry 130 of FIG. 1 to provide proper buffering and amplification of the signal for a second functional circuit block 220.

A gate of the PMOS buffer transistor 216 and a gate of the NMOS buffer transistor 218 receive the input signal from the first functional circuit block 202. In addition, the gates of the PMOS buffer transistor 216 and the NMOS buffer transistor 218 are coupled to each other. A drain of the PMOS buffer transistor 216 and a drain of the NMOS buffer transistor 218 provide an output signal to the second functional circuit block 220.

A source and a body terminal of the PMOS buffer transistor 216 are coupled to a blocking transistor 222. In the illustrative embodiment shown in FIG. 2, the blocking transistor 222 is shown as a PMOS transistor. In other embodiments, the blocking transistor 222 may be an NMOS transistor with a source of the NMOS transistor coupled to the source of the PMOS buffer transistor 216, a gate and a drain terminal coupled to a positive supply line, labeled as $V_{DD}2$, and a reference potential, such as an additional positive supply voltage $V_{DD}3$. In still other embodiments, the blocking transistor 222 may be removed from the architecture 200 and the source of the PMOS buffer transistor 222 is coupled to the positive supply line $V_{DD}2$ and the additional positive supply voltage $V_{DD}3$.

Continuing with the embodiment illustrated in FIG. 2, a source and a body terminal of the NMOS buffer transistor 218 are coupled to a drain of an NMOS blocking transistor 224. The PMOS blocking transistor 222 and the NMOS blocking transistor 224 may each comprise voltage divider devices of blocking circuitry, such as the voltage divider devices 144 of the blocking circuitry 142 of FIG. 1. Additionally, a source and a body terminal of the PMOS blocking transistor 222 are coupled to the positive supply line $V_{DD}2$ via a connector 226 and to the additional positive supply voltage $V_{DD}3$ via a connector 228. A gate of the PMOS blocking transistor 222 is coupled to a negative supply line, labeled as $V_{SS}2$, via a connector 230.

Further, a source and a body terminal of the NMOS blocking transistor 224 are also coupled to the negative supply line $V_{SS}2$ via the connector 230. The source and the body terminal of the NMOS blocking transistor 224 may also be coupled to a switch 232. The switch 232 may include one or more MOS transistors. Additionally, the switch 232 may be operable to couple the negative supply line $V_{SS}2$ to a reference potential. In a particular example, the switch 232 may be operable to provide an additional negative supply voltage $V_{SS}3$ to the source and the body terminal of the NMOS blocking transistor 224 via a connector 234. A gate of the NMOS blocking transistor 224 is coupled to the positive supply line $V_{DD}2$ and the additional positive voltage supply $V_{DD}3$.

The connector 228 is coupled to the connector 234 and a second clamping circuit 236 may be coupled between the connectors 228, 234. The second clamping circuit 236 may provide ESD protection between the additional positive supply voltage $V_{DD}3$ and the additional negative supply voltage $V_{SS}3$. The input and the output nodes of the clamping circuit 236 may be coupled to a capacitor 238.

In some embodiments, the positive supply voltage $V_{DD}1$, the positive supply line $V_{DD}2$, and/or the additional positive supply voltage $V_{DD}3$ may be coupled to different power domains. That is the positive supply voltage $V_{DD}1$, the positive supply line $V_{DD}2$, and/or the additional positive supply voltage $V_{DD}3$ may be coupled to sources that provide different voltages, such as 1.2V, 1.8V, 2.4V, 3.3V, 5V, 12V, etc. In addition, the negative supply voltage $V_{SS}1$, the negative supply line $V_{SS}2$, and/or the additional negative supply voltage $V_{SS}3$ may be coupled to different power domains, such that the negative supply voltage $V_{SS}1$, the negative supply line $V_{SS}2$, and/or the additional negative supply voltage $V_{SS}3$ are coupled to sources that provide different voltages, such as ground, −5V, −3.3V, and so on. In some cases, the negative supply voltage $V_{SS}1$, the negative supply line $V_{SS}2$, and/or the additional negative supply voltage $V_{SS}3$ may each be coupled to ground.

In a particular situation, the switch 232 is closed and the second functional circuit block 220 is turned on. While the switch 232 is closed, the gate of the PMOS blocking transistor 222 is coupled to the additional negative supply voltage $V_{SS}3$ and the gate of the NMOS blocking transistor 224 is coupled to the positive supply voltage $V_{DD}2$ and the positive supply line $V_{DD}3$. In these situations, the PMOS blocking transistor 222 and the NMOS blocking transistor 224 are turned on. In this way, any impedance contributed by the PMOS blocking transistor 222 and the NMOS blocking transistor 224 is minimized. Thus, the speed and integrity of the input signal from the first functional circuit block 202 are maintained.

In another scenario, the second functional circuit block 220 is turned off and the switch 232 may be opened in order to reduce leakage current in the second functional circuit block 220. For example, the negative supply line $V_{SS}2$ may float between the negative supply voltage $V_{SS}3$ and the voltage of the positive supply line $V_{DD}2$ and/or the additional positive supply voltage $V_{DD}3$ and little or no leakage current from the second functional circuit block 220 will result due to the arrangement of components of the architecture 200. In particular, since no source/drain regions of the blocking PMOS transistor 222 and the blocking NMOS transistor 224 are coupled to receive the input signal from the first functional circuit block 202, the leakage current is prevented from flowing to other portions of the architecture 200 and across power domains, thereby minimizing power consumption.

Furthermore, while the switch 232 is open, an electrostatic discharge event may occur. The electrostatic discharge event may cause the switch 232 to close, become at least partly conductive, or be in an undefined state. In a particular example, a positive electrostatic discharge event may take place. A positive electrostatic discharge event may include a positive stress voltage at the positive supply voltage $V_{DD}1$ while the negative supply line $V_{SS}2$ is grounded. In this example, the additional positive supply voltage $V_{DD}3$ may be pulled to the additional negative supply voltage $V_{SS}3$ by the capacitor 238 or by a suitable low ohmic shunting device of the clamping circuitry 236 that is opened during the ESD event. In this way, the blocking NMOS transistor 224 remains off during the ESD event. Consequently, a voltage divider is formed between the gate and the source of the NMOS buffer transistor 218 and the drain and the source of the NMOS blocking transistor 224. In this way, the voltage experienced by the gate of the NMOS buffer transistor 218 during the ESD event is reduced and damage to the gate of the NMOS buffer transistor 218 is minimized or eliminated.

Although the embodiment shown in FIG. 2 indicates that the body terminal of the PMOS buffer transistor 216 is coupled to the source of the PMOS buffer transistor 216 and the body terminal of the NMOS buffer transistor 218 is coupled to the source of the NMOS buffer transistor 218, the body terminals of the PMOS and NMOS buffer transistors 216, 218 may be coupled in different arrangements. For example, the body terminal of the PMOS buffer transistor 216 may be coupled to the drain of the PMOS buffer transistor 216 and the body terminal of the NMOS buffer transistor 218 may be coupled to the drain of the NMOS buffer transistor 218. In another example, the body terminal of the PMOS buffer transistor 216 may be coupled to the second and third positive supply voltages $V_{DD}2$ and $V_{DD}3$, while the body terminal of the NMOS buffer transistor 218 may be coupled to the second negative supply voltage $V_{SS}2$ or to the third negative supply voltage $V_{SS}3$. In addition, although the body terminals of the PMOS and NMOS blocking transistors 222, 224 are shown coupled to the respective sources of the PMOS and NMOS blocking transistors 222, 224, the body terminal of the PMOS blocking transistor 222 may be coupled to the drain of the PMOS blocking transistor 222 and the body terminal of the NMOS blocking transistor 224 may be coupled to the drain of the NMOS blocking transistor 224.

Further, in some embodiments, the p-wells of the NMOS blocking and buffer transistors 218, 224 may be isolated from a p-substrate of the semiconductor chip that includes the architecture 200. Thus, the p-wells of the transistors 218 and 224 may be separated from the p-substrate by an n-doped region. In some instances, the transistors 216, 218, and 224 may share a common n-well. In other embodiments, the transistors 216, 218, 222, and 224 may be situated in a dual well arrangement. In still additional embodiments, the transistors 218 and 224 may share an isolated p-well, while the transistors 216, 218, 222, and 224 share an n-well.

In embodiments where the PMOS blocking transistor 222 is replaced with an NMOS transistor, the transistors 218, 222, 224 may be formed with a triple well arrangement where the p-well of each of the transistors 218, 222, 224 is isolated from the p-substrate. In some cases, the transistors 218 and 222 may share an isolated p-well. Further, the transistors 216, 218, 222, and 224 may share a consecutive n-well. Thus, by replacing the PMOS blocking transistor 222 with an NMOS transistor, the layout area of the interface circuit 214 may be reduced.

Although the embodiment shown in FIG. 2 includes a complementary MOS architecture with both the PMOS buffer transistor 216 and the NMOS buffer transistor 218, the architecture 200 may also be implemented with only the PMOS buffer transistor 216 and the PMOS blocking transistor 222 or the NMOS buffer transistor 218 and the NMOS blocking transistor 224.

Figure 3:
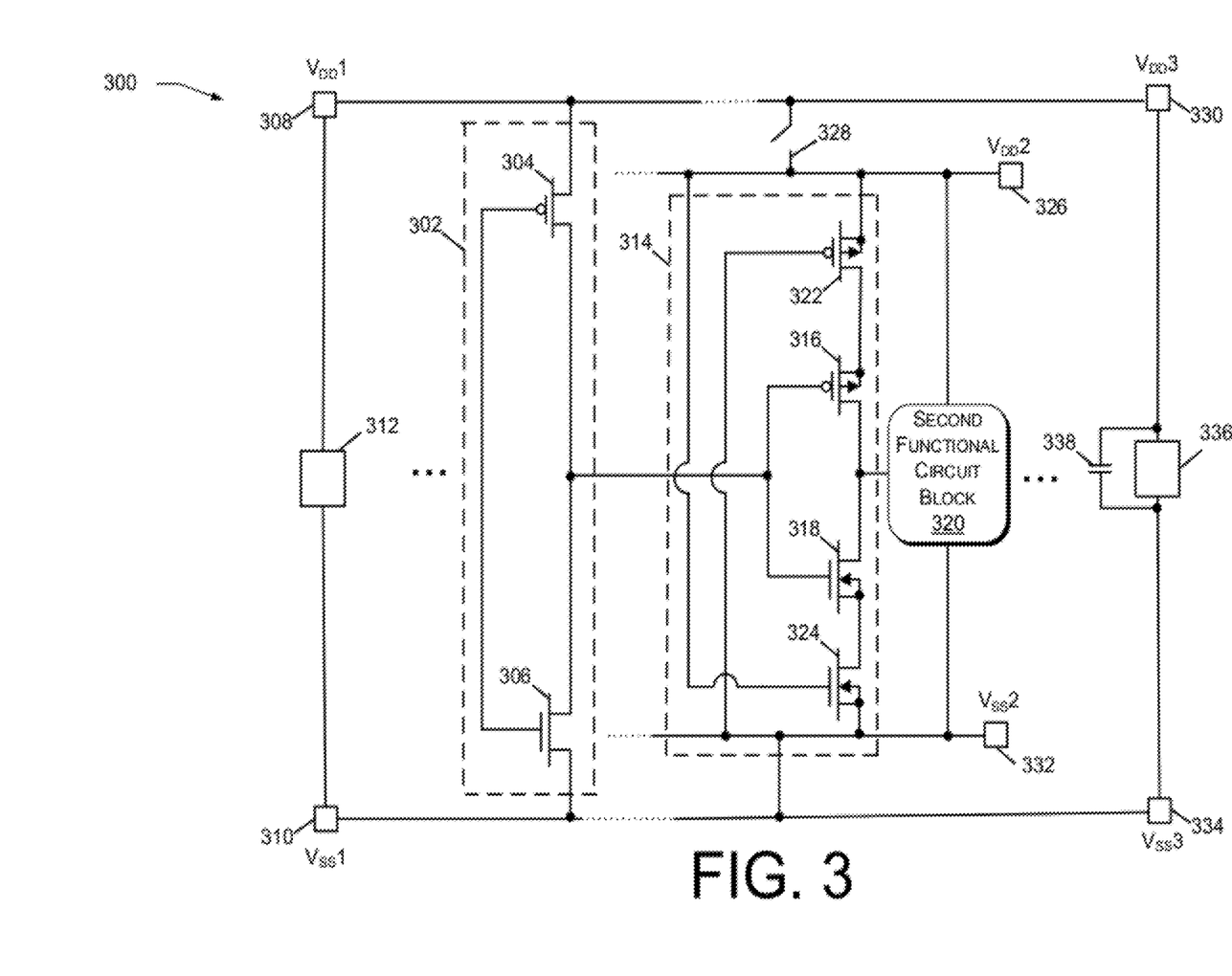
FIG. 3 is a schematic diagram of an architecture including an electrostatic discharge blocking circuit coupled to a buffer circuit that is coupled between functional circuit blocks of a semiconductor chip. The electrostatic discharge blocking circuit is coupled to an external positive supply voltage via a micro switch.

FIG. 3 is a schematic diagram of an architecture 300 including an electrostatic discharge blocking circuit coupled to a buffer circuit that is coupled between functional circuit blocks of a semiconductor chip. The architecture 300 includes a first functional circuit block 302. The first functional circuit block 302 may include a number of transistors represented by PMOS transistor 304 and NMOS transistor 306. The first functional circuit block 302 may also include a number of other components, such as one or more impedance devices, one or more capacitors, one or more inductors, one or more switches, one or more diodes, and the like. The components of the first functional circuit block 302 may be arranged in order to perform certain operations for a computing device.

The first functional circuit block 302 may be coupled to a pad, pin, wire, or other suitable connector, 308 that provides a positive supply voltage $V_{DD}1$ to the first functional circuit block 302. $V_{DD}1$ may also be provided to other portions of a semiconductor chip that includes the architecture 300. The first functional circuit block 302 may also be coupled to connector 310 that provides a negative supply voltage $V_{SS}1$ to the first functional circuit block 302. Additionally, a clamping circuit 312 may be coupled between the connectors 308, 310. The clamping circuit 312 can provide protection for $V_{DD}1$ and $V_{SS}1$ during electrostatic discharge events. For example, the clamping circuit 312 may limit any overvoltage that occurs between $V_{DD}1$ and $V_{SS}1$ during an electrostatic discharge event.

The architecture 300 also includes an interface circuit 314 that receives a signal from the first functional circuit block 302 as an input signal. The input signal to the interface circuit 314 may be an analog signal or a digital signal. The interface circuit 314 includes a PMOS buffer transistor 316 and an NMOS buffer transistor 318. The PMOS buffer transistor 316 and the NMOS buffer transistor 318 may operate as buffer circuitry, such as the buffer circuitry 130 of FIG. 1 to provide proper buffering and amplification of the signal for a second functional circuit block 320.

A gate of the PMOS buffer transistor 316 and a gate of the NMOS buffer transistor 318 receive the input signal from the first functional circuit block 302. In addition, the gates of the PMOS buffer transistor 316 and the NMOS buffer transistor 318 are coupled to each other. A drain of the PMOS buffer transistor 316 and a drain of the NMOS buffer transistor 318 provide an output signal to the second functional circuit block 320.

A source and a body terminal of the PMOS buffer transistor 316 are coupled to a drain of a blocking transistor 322. In the illustrative embodiment shown in FIG. 3, the blocking transistor 322 is shown as a PMOS transistor. In other embodiments, the blocking transistor 322 may be an NMOS transistor. In still other embodiments, the blocking transistor 322 may be removed from the architecture 300 and the source of the PMOS buffer transistor 322 is coupled to a positive supply line labeled as $V_{DD}2$.

Continuing with the embodiment illustrated in FIG. 3, a source and a body terminal of the NMOS buffer transistor 318 are coupled to a drain of an NMOS blocking transistor 324. The PMOS blocking transistor 322 and the NMOS blocking transistor 324 may comprise voltage divider devices of blocking circuitry, such as the voltage divider devices 144 of the blocking circuitry 142 of FIG. 1. The source and a body terminal of the PMOS blocking transistor 322 are coupled to the positive supply line $V_{DD}2$ via a connector 326. The architecture 300 also includes a switch 328 that is operable to couple the source of the PMOS blocking transistor 322 to a reference potential, such as an additional positive supply voltage $V_{DD}3$, via a connector 330. A gate of the PMOS blocking transistor 322 is coupled to a negative supply line, labeled as $V_{SS}2$, via a connector 332.

Further, a source and a body terminal of the NMOS blocking transistor 324 are coupled to the negative supply line $V_{SS}2$ via the connector 332. The source and the body terminal of the NMOS blocking transistor 324 may also be coupled a reference potential, such as an additional negative supply voltage $V_{SS}3$, via a connector 334. A gate of the NMOS blocking transistor 324 is coupled to the positive supply line $V_{DD}2$. The switch 328 may also be operable to connect the gate of the NMOS blocking transistor 324 to the additional positive supply voltage $V_{DD}3$.

The connector 330 is coupled to the connector 334 and a second clamping circuit 336 may be coupled between the connectors 330, 334. The second clamping circuit 336 may provide ESD protection between the additional positive supply voltage $V_{DD}3$ and the additional negative supply voltage $V_{SS}3$. The input and the output nodes of the clamping circuit 336 may be coupled to a capacitor 338.

In a particular situation, the switch 328 is closed and the second functional circuit block 320 is turned on. While the switch 328 is closed, the gate of the PMOS blocking transistor 322 is coupled to the negative supply line $V_{SS}2$ and the additional negative supply voltage $V_{SS}3$ and the gate of the NMOS blocking transistor 324 is coupled to the positive supply line $V_{DD}2$ and the additional positive supply voltage $V_{DD}3$. In these situations, the PMOS blocking transistor 322 and the NMOS blocking transistor 324 are turned on. In this way, any impedance contributed by the PMOS blocking transistor 322 and the NMOS blocking transistor 324 is minimized. Thus, the speed and integrity of the input signal from the first functional circuit block 302 are maintained.

In another scenario, the second functional circuit block 320 is turned off and the switch 328 may be opened in order to reduce leakage current from the second functional circuit block 320. For example, the positive supply line $V_{DD}2$ may float between the additional positive supply voltage $V_{DD}3$ and a voltage of the negative supply line $V_{SS}2$ and/or the additional negative supply voltage $V_{SS}3$, and little or no leakage current from the second functional circuit block 320 will result due to the arrangement of components of the architecture 300. In particular, since no source/drain regions of the blocking PMOS transistor 322 and the NMOS blocking transistor 324 are coupled to receive the input signal from the first functional circuit block 302, the leakage current is prevented from flowing to other portions of the architecture 300 and across power domains, thereby minimizing power consumption.

Furthermore, while the switch 328 is open, an electrostatic discharge event may occur. The electrostatic discharge event may then cause the switch 328 to close, become at least partly conductive, or be in an undefined state. In a particular example, a negative electrostatic discharge event may take place. The negative electrostatic discharge event may include a negative stress voltage at the negative supply voltage $V_{SS}1$ while the voltage at the positive supply line $V_{DD}2$ is grounded. In this example, the additional negative supply voltage $V_{SS}3$ may be pulled to the additional positive supply voltage $V_{DD}3$ by the capacitor 338 or by a low ohmic shunting device of the clamping circuitry 336 that is opened during the ESD event. In this way, the blocking PMOS transistor 322 remains off during the ESD event. Consequently, a voltage divider is formed between the gate and the source of the PMOS buffer transistor 316 and the drain and the source of the PMOS blocking transistor 322. In this way, the voltage experienced by the gate of the PMOS buffer transistor 316 during the ESD event is reduced and damage to the gate of the PMOS buffer transistor 316 is minimized or eliminated.

Although the embodiment shown in FIG. 3 indicates that the body terminal of the PMOS buffer transistor 316 is coupled to the source of the PMOS buffer transistor 316 and the body terminal of the NMOS buffer transistor 318 is coupled to the source of the NMOS buffer transistor 318, the body terminals of the PMOS and NMOS buffer transistors 316, 318 may be coupled in different arrangements. For example, the body terminal of the PMOS buffer transistor 316 may be coupled to the drain of the PMOS buffer transistor 316 and the body terminal of the NMOS buffer transistor 318 may be coupled to the drain of the NMOS buffer transistor 318. In another example, the body terminal of the PMOS buffer transistor 316 may be coupled to the second positive supply voltage $V_{DD}2$ or to the third to positive supply voltage $V_{DD}3$, while the body terminal of the NMOS buffer transistor 318 may be coupled to the second and third negative supply voltages $V_{SS}2$ and $V_{SS}3$. In addition, although the body terminals of the PMOS and NMOS blocking transistors 322, 324 are shown coupled to the respective sources of the PMOS and NMOS blocking transistors 322, 324, the body terminal of the PMOS blocking transistor 322 may be coupled to the drain of the PMOS blocking transistor 322 and the body terminal of the NMOS blocking transistor 324 may be coupled to the drain of the NMOS blocking transistor 324.

Further, in some embodiments, the p-wells of the NMOS blocking and buffer transistors 318, 324 may be isolated from a p-substrate of the semiconductor chip that includes the architecture 300. In some instances, the transistors 316, 318, and 324 may share a common n-well. In other embodiments, the transistors 316, 318, 322, and 324 may be situated in a dual well arrangement. In still additional embodiments, the transistors 318 and 324 may share an isolated p-well, while the transistors 316, 318, 322, and 324 share an n-well.

In embodiments where the PMOS blocking transistor 322 is replaced with an NMOS transistor, the transistors 318, 322, 324 may be formed with a triple well arrangement where the p-well of each of the transistors 318, 322, 324 is isolated from the p-substrate. In some cases, the transistors 318 and 322 may share an isolated p-well. Further, the transistors 316, 318, 322, and 324 may share a consecutive n-well. Thus, by replacing the PMOS blocking transistor 322 with an NMOS transistor, the layout area of the interface circuit 314 may be reduced.

Figure 4:
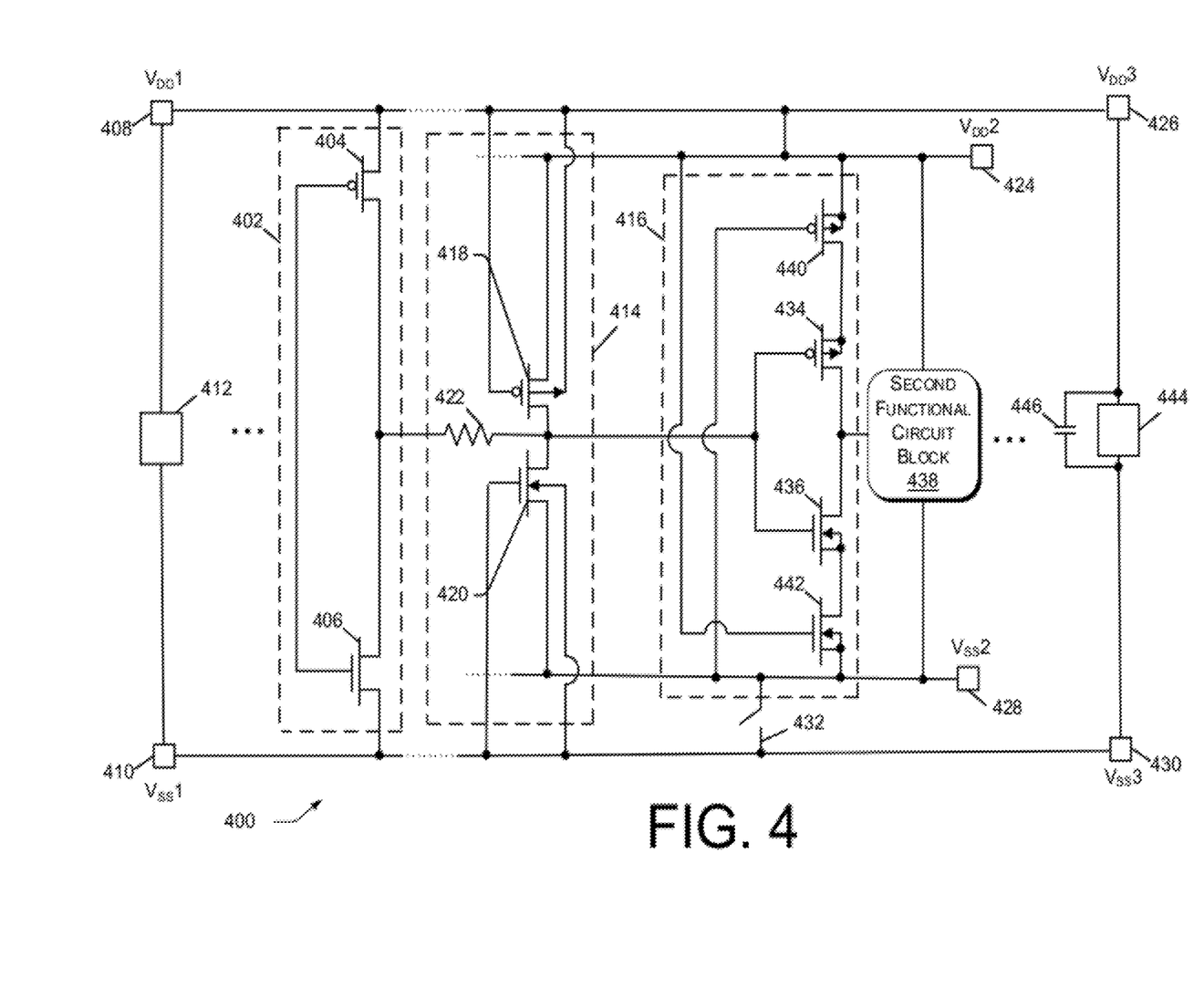
FIG. 4 is a schematic diagram of an electrostatic discharge blocking circuit and a clamping circuit coupled to a buffer circuit that is coupled between functional blocks of a semiconductor chip.

FIG. 4 is a schematic diagram of an architecture 400 including an electrostatic discharge blocking circuit and a clamping circuit coupled to a buffer circuit that is coupled between functional blocks of a semiconductor chip. The architecture 400 includes a first functional circuit block 402. The first functional circuit block 402 may include a number of components, such as a number of transistors represented by PMOS transistor 404 and NMOS transistor 406.

The first functional circuit block 402 may be coupled to a pad, pin, wire, or other suitable connector, 408 that provides a positive supply voltage $V_{DD}1$ to the first functional circuit block 402. The first functional circuit block 402 may also be coupled to connector 410 that provides a negative supply voltage $V_{SS}1$ to the first functional circuit block 402. Additionally, a clamping circuit 412 may be coupled between the connectors 408, 410.

In addition, the architecture 400 includes an ESD clamping circuit 414 to provide protection to components of an interface circuit 416 during an ESD event. The ESD clamping circuit 414 includes a PMOS clamping transistor 418, an NMOS clamping transistor 420, and an impedance device 422, such as one or more resistors, one or more MOS transistors, and the like. A source of the PMOS clamping transistor 418 is coupled to a positive supply line, labeled as $V_{DD}2$, via a connector 424, while a gate and a body terminal of the PMOS clamping transistor 418 are coupled to an additional positive supply voltage $V_{DD}3$ via a connector 426. A drain of the PMOS clamping transistor 418 is coupled to the impedance device 422.

Further, a source of the NMOS clamping transistor 420 is coupled to a negative supply line, labeled as $V_{SS}2$, via a connector 428 and a gate and a body terminal of the NMOS clamping transistor 420 are coupled to an additional negative supply voltage $V_{SS}3$ via a connector 430. The source of the NMOS clamping transistor 420 may also be coupled to the additional negative supply voltage $V_{SS}3$ via a switch 432. A drain of the NMOS clamping transistor 420 is coupled to the impedance device 422. The impedance device 422 is also coupled to receive a signal from the first functional circuit block 402 that serves as an input signal to the interface circuit 416.

The interface circuit 416 includes a PMOS buffer transistor 434 and an NMOS buffer transistor 436. The PMOS buffer transistor 434 and the NMOS buffer transistor 436 may operate as buffer circuitry, such as the buffer circuitry 130 of FIG. 1 to provide proper buffering and amplification of the signal for a second functional circuit block 438.

A gate of the PMOS buffer transistor 434 and a gate of the NMOS buffer transistor 436 receive the input signal from the first functional circuit block 402. In addition, the gates of the PMOS buffer transistor 434 and the NMOS buffer transistor 436 are coupled to each other. A drain of the PMOS buffer transistor 434 and a drain of the NMOS buffer transistor 436 provide an output signal to the second functional circuit block 438.

A source and a body terminal of the PMOS buffer transistor 434 are coupled to a drain of a blocking transistor 440. In the illustrative embodiment shown in FIG. 4, the blocking transistor 440 is shown as a PMOS transistor. In other embodiments, the blocking transistor 440 may be an NMOS transistor. In still other embodiments, the blocking transistor 440 may be removed from the architecture 400 and the source of the PMOS buffer transistor 434 is coupled to the positive supply line $V_{DD}2$ and the additional positive supply voltage $V_{DD}3$.

Continuing with the embodiment illustrated in FIG. 4, a source and a body terminal of the NMOS buffer transistor 436 are coupled to a drain of an NMOS blocking transistor 442. The PMOS blocking transistor 440 and the NMOS blocking transistor 442 may each comprise voltage divider devices of blocking circuitry, such as the voltage divider devices 144 of the blocking circuitry 142 of FIG. 1. Additionally, a source and a body terminal of the PMOS blocking transistor 440 are coupled to the positive supply line $V_{DD}2$ via the connector 424 and to the additional positive supply voltage $V_{DD}3$ via a connector 426. A gate of the PMOS blocking transistor 440 is coupled to the negative supply line $V_{SS}2$ via the connector 428.

Further, a source and a body terminal of the NMOS blocking transistor 442 are coupled to the negative supply line $V_{SS}2$ via the connector 428. The source and the body terminal of the NMOS blocking transistor 442 may also be coupled to the switch 432. The switch 432 may be operable to provide the additional negative supply voltage $V_{SS}3$ to the source and the body terminal of the NMOS blocking transistor 442 via the connector 430. A gate of the NMOS blocking transistor 442 is coupled to the positive supply line $V_{DD}2$ and the additional positive supply voltage $V_{DD}3$.

The connector 426 is coupled to the connector 430 and a second clamping circuit 444 may be coupled between the connectors 426, 430. The second clamping circuit 444 may provide ESD protection between the positive supply voltage $V_{DD}3$ and the negative supply voltage $V_{SS}3$. The input and the output nodes of the clamping circuit 444 may be coupled to a capacitor 446. In some embodiments, the positive supply voltage $V_{DD}1$, the positive supply line $V_{DD}2$, and/or the additional positive supply voltage $V_{DD}3$ may be coupled to different power domains. In addition, the negative supply voltage $V_{SS}1$, the negative supply line $V_{SS}2$, and/or the additional negative supply voltage $V_{SS}3$ may represent different power domains.

In a particular situation, the switch 432 is closed and the second functional circuit block 438 is turned on. While the switch 432 is closed, the gate of the PMOS blocking transistor 440 is coupled to the additional negative supply voltage $V_{SS}3$ and the gate of the NMOS blocking transistor 442 is coupled to the positive supply line $V_{DD}2$ and the additional positive supply voltage $V_{DD}3$. In these situations, the PMOS blocking transistor 440 and the NMOS blocking transistor 442 are turned on. In this way, any impedance contributed by the PMOS blocking transistor 440 and the NMOS blocking transistor 442 is minimized. Thus, the speed and integrity of the input signal from the first functional circuit block 402 are maintained.

In another scenario, the second functional circuit block 438 is turned off and the switch 432 may be opened in order to reduce leakage current from the second functional circuit block 438. For example, the negative supply line $V_{SS}2$ may float between the negative supply voltage $V_{SS}3$ and the voltage of the positive supply line, $V_{DD}2$ and/or the positive supply voltage $V_{DD}3$ and little or no leakage current from the second functional circuit block 438 will result due to the arrangement of components of the architecture 400. In particular, since no source/drain regions of the PMOS blocking transistor 440 and the blocking NMOS transistor 442 are coupled to receive the input signal from the first functional block 402, the leakage current is prevented from flowing to other portions of the architecture 400, such as the ESD clamping circuit 414, and across power domains, thereby minimizing power consumption.

Furthermore, while the switch 432 is open, an electrostatic discharge event may occur. The electrostatic discharge event may then cause the switch 432 to close, become at least partly conductive, or be in an undefined state. In a particular example, a positive electrostatic discharge event may take place. The positive electrostatic discharge event may include a cross-domain positive ESD stress from the positive supply voltage $V_{DD}1$ to the negative supply line $V_{SS}2$ when the positive supply line $V_{SS}2$ is grounded. In this example, the additional positive supply voltage $V_{DD}3$ may be pulled to the additional negative supply voltage $V_{SS}3$ by the capacitor 446 or by a suitable low ohmic shunting device of the clamping circuitry 444 that is opened during the ESD event. In this way, the blocking NMOS transistor 442 remains off during the ESD event. Consequently, a voltage divider is formed between the gate and the source of the NMOS buffer transistor 436 and the drain and the source of the NMOS blocking transistor 442. In this way, the voltage experienced by the gate of the NMOS buffer transistor 436 during the ESD event is reduced and damage to the gate of the NMOS buffer transistor 436 is minimized or eliminated. In addition, the ESD clamping circuit 414 may be configured to further reduce the effects of the positive ESD stress on the gate of the NMOS buffer transistor 436.

In some embodiments, the p-wells of the NMOS blocking and buffer transistors 436, 442 may be isolated from a p-substrate of the semiconductor chip that includes the architecture 400. In some instances, the transistors 434, 436, and 442 may share a common n-well in order to isolate the p-wells of the transistors 434, 436, and 442. In other embodiments, the transistors 434, 436, 440, and 442 may be situated in a dual well arrangement. In still additional embodiments, the transistors 436 and 442 may share an isolated p-well, while the transistors 434, 436, 440, and 442 share an n-well.

In embodiments where the PMOS blocking transistor 440 is replaced with an NMOS transistor, the transistors 436, 440, 442 may be formed with a triple well arrangement where the p-well of each of the transistors 436, 440, 442 is isolated from the p-substrate. In some cases, the transistors 436 and 440 may share an isolated p-well. Further, the transistors 434, 436, 440, 442 may share a consecutive n-well. Thus, by replacing the PMOS blocking transistor 440 with an NMOS transistor, the layout area of the interface circuit 416 may be reduced.

Although the embodiment shown in FIG. 4 shows the switch 432 coupled between the NMOS blocking transistor 442 and the additional negative supply voltage $V_{SS}3$ the switch 432 may be replaced with a short connecting the NMOS blocking transistor 442 directly to the additional negative supply voltage $V_{SS}3$. In this embodiment, the short between the PMOS blocking transistor 440 and the additional positive supply voltage $V_{DD}3$ may be replaced with a switch. Thus, the architecture 400 would be similar to the architecture 300 illustrated in FIG. 3 and operate in a similar manner during normal operation of the architecture 400 and during an ESD event.

Figure 5:
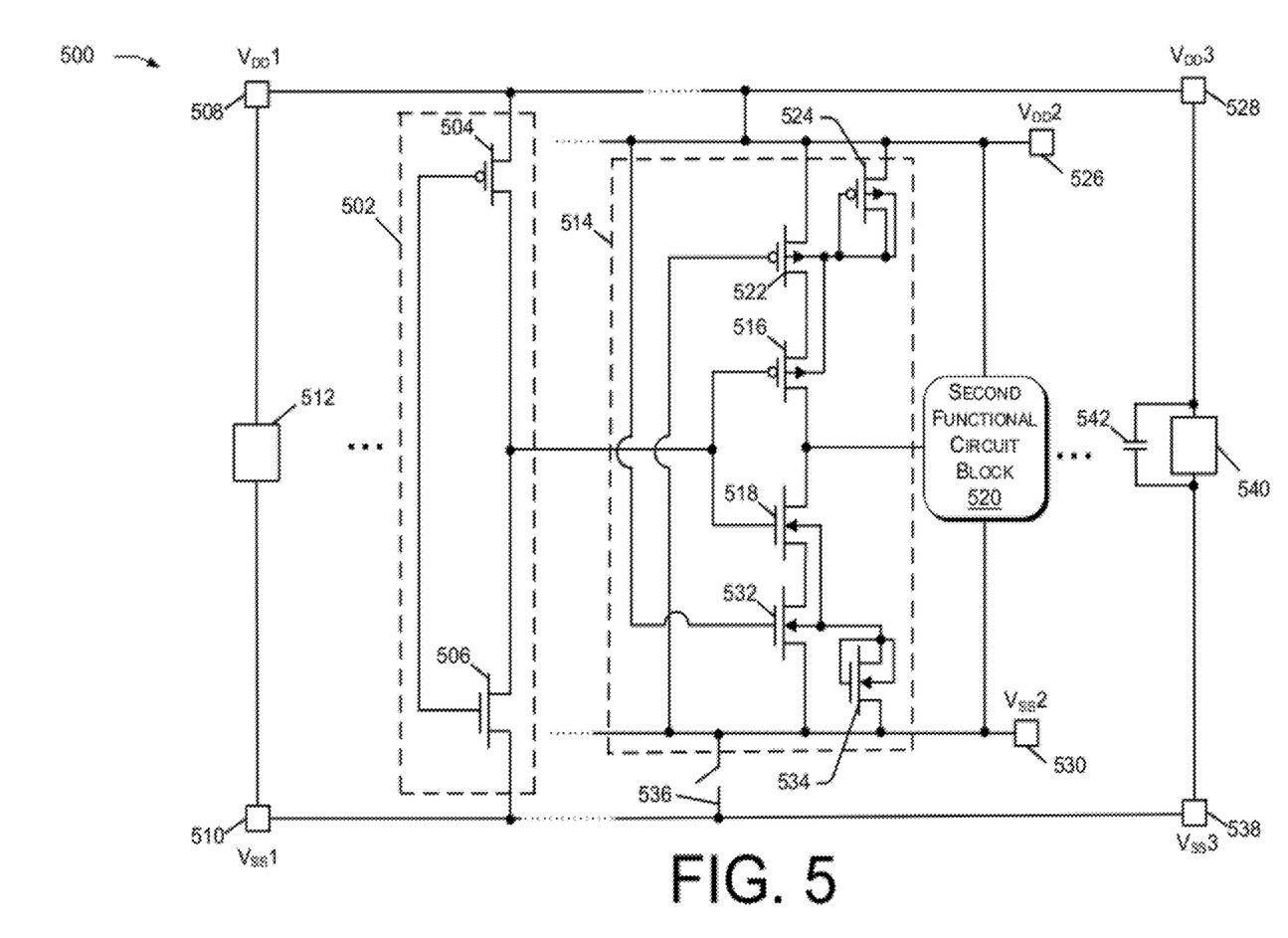
FIG. 5 is a schematic diagram of a first alternative embodiment of an electrostatic discharge blocking circuit coupled to a buffer circuit that is coupled between functional circuit blocks of a semiconductor chip.

FIG. 5 is a schematic diagram of an architecture 500 that includes a first alternative embodiment of an electrostatic discharge circuit coupled to a buffer circuit that is coupled between functional blocks of a semiconductor chip. The architecture 500 includes a first functional circuit block 502. The first functional circuit block 502 may include a number of components, such as a number of transistors represented by PMOS transistor 504 and NMOS transistor 506.

The first functional circuit block 502 may be coupled to a connector, 508 that provides a positive supply voltage $V_{DD}1$ to the first functional circuit block 502. The first functional circuit block 502 may also be coupled to connector 510 that provides a negative supply voltage $V_{SS}1$ to the first functional circuit block 502. Additionally, a clamping circuit 512 may be coupled between the connectors 508, 510.

The architecture 500 also includes an interface circuit 514 that receives a signal from the first functional circuit block 502 as an input signal. The interface circuit 514 includes a PMOS buffer transistor 516 and an NMOS buffer transistor 518. The PMOS buffer transistor 516 and the NMOS buffer transistor 518 may operate as buffer circuitry, such as the buffer circuitry 130 of FIG. 1 to provide proper buffering and amplification of the signal for a second functional circuit block 520.

A gate of the PMOS buffer transistor 516 and a gate of the NMOS buffer transistor 518 receive the input signal from the first functional circuit block 502. In addition, the gates of the PMOS buffer transistor 516 and the NMOS buffer transistor 518 are coupled to each other. A drain of the PMOS buffer transistor 516 and a drain of the NMOS buffer transistor 518 provide an output signal to the second functional circuit block 520.

A source of the PMOS buffer transistor 516 is coupled to a drain of a blocking transistor 522. In the illustrative embodiment shown in FIG. 5, the blocking transistor 522 is shown as a PMOS transistor. In other embodiments, the blocking transistor 522 may be an NMOS transistor. In still other embodiments, the blocking transistor 522 may be removed from the architecture 500 and the source of the PMOS buffer transistor 522 is coupled to a positive supply line $V_{DD}2$ and an additional positive supply voltage $V_{DD}3$. Continuing with the embodiment illustrated in FIG. 5, a body terminal of the PMOS buffer transistor 516 is coupled to a gate, a drain, and a body terminal of an additional PMOS blocking transistor 524. Additionally, a source of the PMOS blocking transistor 522 is coupled to the positive supply line $V_{DD}2$ via a connector 526 and to the additional positive supply voltage $V_{DD}3$ via a connector 528. A gate of the PMOS blocking transistor 522 is coupled to a negative supply line $V_{SS}2$ via a connector 530. A body terminal of the PMOS blocking transistor 522 is also coupled to the gate, drain, and body terminal of the additional PMOS blocking transistor 524. Further, the source of the additional PMOS blocking transistor 524 is coupled to the positive supply line $V_{DD}2$ and the additional positive supply voltage $V_{DD}3$.

A source of the NMOS buffer transistor 518 is coupled to a drain of an NMOS blocking transistor 532. The PMOS blocking transistor 522 and the NMOS blocking transistor 532 may comprise voltage divider devices of blocking circuitry, such as the voltage divider devices 144 of the blocking circuitry 142 of FIG. 1. A body terminal of the NMOS buffer transistor 518 is coupled to a drain, a gate, and a body terminal of an additional NMOS blocking transistor 534. Further, a source of the NMOS blocking transistor 532 is also coupled to the negative supply line $V_{SS}2$ via the connector 530. The source of the NMOS blocking transistor 534 may also be coupled to a switch 536. The switch 536 may be operable to provide an additional negative supply voltage $V_{SS}3$ to the source of the NMOS blocking transistor 532 via a connector 538. A gate of the NMOS blocking transistor 532 is coupled to the positive supply line $V_{DD}2$ and the additional positive supply voltage $V_{DD}3$ and the body terminal of the NMOS blocking transistor 532 is also coupled to the gate, drain, and body terminal of the additional NMOS blocking transistor 534. A source of the additional NMOS blocking transistor 534 is coupled to the negative supply line $V_{SS}2$ and the switch 536.

The connector 528 is coupled to the connector 538 and a second clamping circuit 540 may be coupled between the connectors 528, 538. The second clamping circuit 540 may provide ESD protection between the positive supply voltage $V_{DD}3$ and the additional negative supply voltage $V_{SS}3$. The input and the output nodes of the clamping circuit 540 may be coupled to a capacitor 542. In some embodiments, the positive supply voltage $V_{DD}1$, the positive supply line $V_{DD}2$, and/or the additional positive supply voltage $V_{DD}3$ may represent different power domains. In addition, the negative supply voltage $V_{SS}1$, the negative supply line $V_{SS}2$, and/or the additional negative supply voltage $V_{SS}3$ may also represent different power domains.

In a particular situation, the switch 536 is closed and the second functional circuit block 520 is turned on. While the switch 536 is closed, the gate of the PMOS blocking transistor 522 is coupled to the additional negative supply voltage $V_{SS}3$ and the gate of the NMOS blocking transistor 532 is coupled to the positive supply line $V_{DD}2$ and the additional positive supply voltage $V_{DD}3$. In these situations, the PMOS blocking transistor 522 and the NMOS blocking transistor 532 are turned on. In this way, any impedance contributed by the PMOS blocking transistor 522 and the NMOS blocking transistor 532 is minimized. Thus, the speed and integrity of the input signal from the first functional circuit block 502 are maintained.

In another scenario, the second functional circuit block 520 is turned off and the switch 536 may be opened in order to reduce leakage current from the second functional circuit block 520. For example, the voltage of the negative supply line $V_{SS}2$ may float between the negative supply voltage $V_{SS}3$ and the voltage of the positive supply line $V_{DD}2$ and/or the additional positive supply voltage $V_{DD}3$ and little or no leakage current from the second functional circuit block 520 will result due to the arrangement of components of the architecture 500. In particular, since no source/drain regions of the PMOS blocking transistor 522 and the blocking NMOS transistor 532 are coupled to receive the input signal from the first functional block 502, the leakage current is prevented from flowing to other portions of the architecture 500 and across power domains, thereby minimizing power consumption.

Furthermore, while the switch 536 is open, an electrostatic discharge event may occur. The electrostatic discharge event may then cause the switch 536 to close, become at least partly conductive, or be in an undefined state. In a particular example, a positive electrostatic discharge event may take place. The positive electrostatic discharge event can include a cross-domain positive ESD stress from the positive supply voltage $V_{DD}1$ to the negative supply line $V_{SS}2$ when the negative supply line $V_{SS}2$ is grounded. In this example, the additional positive supply voltage $V_{DD}3$ may be pulled to the additional negative supply voltage $V_{SS}3$ by the capacitor 542 or by a suitable low ohmic shunting device of the clamping circuitry 544 that is opened during the ESD event. In this way, the blocking NMOS transistor 532 remains off during the ESD event. Consequently, a voltage divider is formed between the gate and the source of the NMOS buffer transistor 518 and the drain and the source of the NMOS blocking transistor 532. Furthermore, the additional NMOS blocking transistor 534 may be operable to bias the p-wells of the NMOS buffer transistor 518 and the NMOS blocking transistor 532 to provide reverse blocking for any body diodes of the transistors 518, 532 that may open up during the ESD event. The additional NMOS blocking transistor 534 is also operable to provide free floating of the voltage at the node between the source of the NMOS buffer transistor 518 and the drain of the NMOS blocking transistor 532 to enhance the effects of the voltage divider formed between the gate and the source of the NMOS buffer transistor 518 and the drain and the source of the NMOS blocking transistor 532. In this way, the voltage experienced by the gate of the NMOS buffer transistor 518 during the ESD event is reduced and damage to the gate of the NMOS buffer transistor 518 is minimized or eliminated.

In some embodiments, the p-wells of the NMOS transistors 518, 532, and 534 may be isolated from a p-substrate of the semiconductor chip that includes the architecture 500. In some instances, the NMOS transistors 518, 532, and 534 may share a common p-well. Additionally, the PMOS transistors 516, 522, and 524 may share a common n-well. By sharing a common p-well between the NMOS transistors 518, 532, 534 and a common n-well for the PMOS transistors 516, 522, and 524, the layout area of the interface circuit 514 may be minimized.

Although the embodiment shown in FIG. 5 shows the switch 536 coupled between the NMOS blocking transistor 532 and the additional NMOS blocking transistor 534 and the additional negative supply voltage $V_{SS}3$ the switch 536 may be replaced with a short connecting the NMOS blocking transistor 532 and the additional NMOS blocking transistor 534 directly to the additional negative supply voltage $V_{SS}3$. In this embodiment, the short between the PMOS blocking transistor 522 and the additional PMOS blocking transistor 524 and the additional positive supply voltage $V_{DD}3$ may be replaced with a switch. Thus, the architecture 500 would be similar to the architecture 300 illustrated in FIG. 3 and operate in a similar manner during normal operation of the architecture 500 and during an ESD event. Continuing with this example, the architecture 500, would also benefit from greater voltage division effects between the gate and the source of the PMOS buffer transistor 516 and the drain and the source of the PMOS blocking transistor 522 due to the floating of the voltage between the drain of the PMOS blocking transistor 522 and the source of the PMOS buffer transistor 516 caused by coupling the n-wells of the transistors 516, 522 to the additional PMOS blocking transistor 524. The additional PMOS blocking transistor 524 may also provide reverse blocking of any body diodes that may open up in the transistors 516 and 522 during an ESD event.

Figure 6:
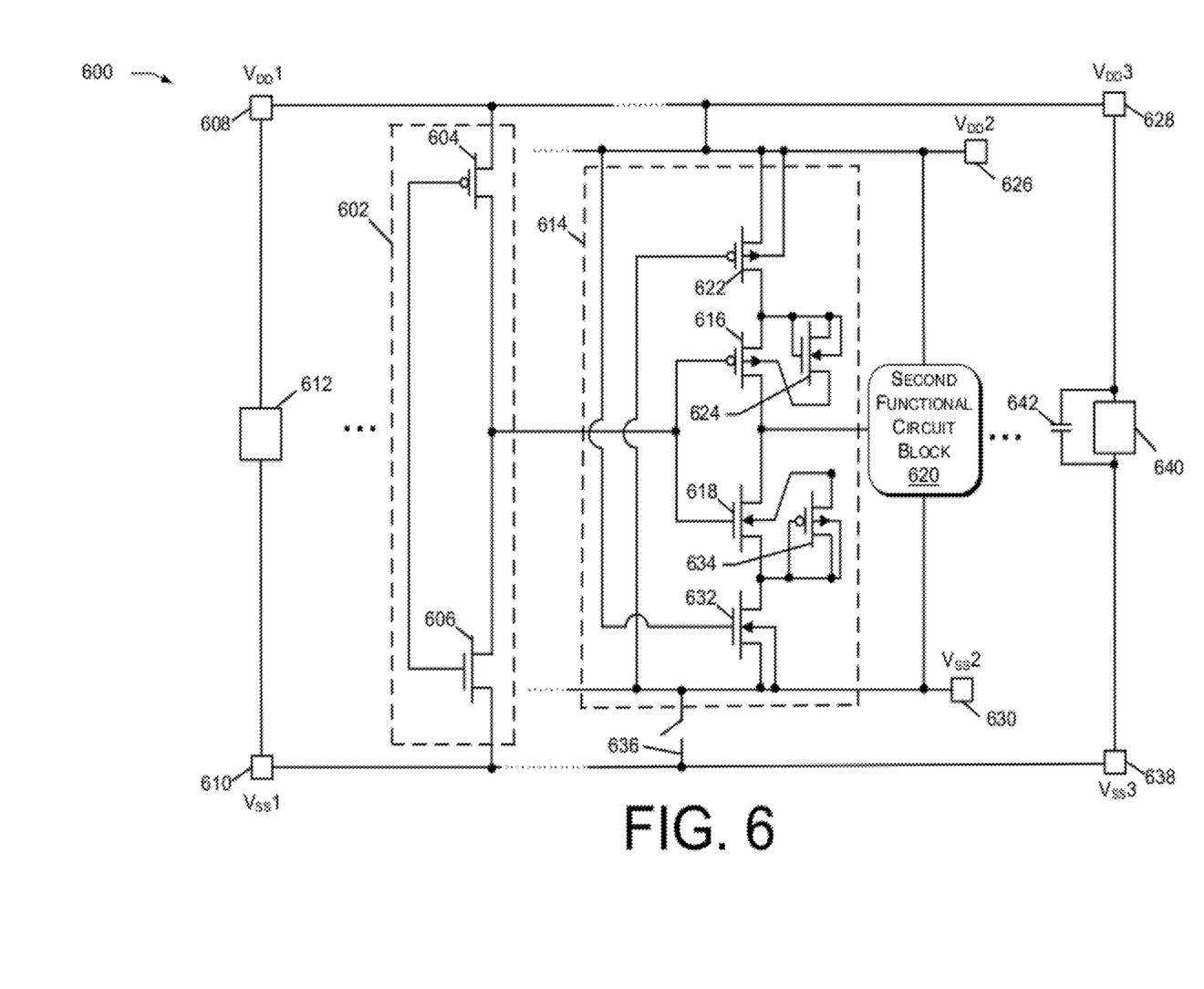
FIG. 6 is a schematic diagram of a second alternative embodiment of an electrostatic discharge blocking circuit coupled to a buffer circuit that is coupled between functional circuit blocks of a semiconductor chip.

FIG. 6 is a schematic diagram of an architecture 600 including a second alternative embodiment of an electrostatic discharge circuit coupled to a buffer circuit that is coupled between functional blocks of a semiconductor chip. The architecture 600 includes a first functional circuit block 602. The first functional circuit block 602 may include a number of components, such as a number of transistors represented by PMOS transistor 604 and NMOS transistor 606.

The first functional circuit block 602 may be coupled to a connector, 608 that provides a positive supply voltage $V_{DD}1$ to the first functional circuit block 602. The first functional circuit block 602 may also be coupled to connector 610 that provides a negative supply voltage $V_{SS}1$ to the first functional circuit block 602. Additionally, a clamping circuit 612 may be coupled between the connectors 608, 610.

The architecture 600 also includes an interface circuit 614 that receives a signal from the first functional circuit block 602 as an input signal. The interface circuit 614 includes a PMOS buffer transistor 616 and an NMOS buffer transistor 618. The PMOS buffer transistor 616 and the NMOS buffer transistor 618 may operate as buffer circuitry, such as the buffer circuitry 130 of FIG. 1 to provide proper buffering and amplification of the signal for a second functional circuit block 620.

A gate of the PMOS buffer transistor 616 and a gate of the NMOS buffer transistor 618 receive the input signal from the first functional circuit block 602. In addition, the gates of the PMOS buffer transistor 616 and the NMOS buffer transistor 618 are coupled to each other. A drain of the PMOS buffer transistor 616 and a drain of the NMOS buffer transistor 618 provide an output signal to the second functional circuit block 620.

A source of the PMOS buffer transistor 616 is coupled to a drain of a blocking transistor 622. In the illustrative embodiment shown in FIG. 6, the blocking transistor 622 is shown as a PMOS transistor. In other embodiments, the blocking transistor 622 may be an NMOS transistor. In still other embodiments, the blocking transistor 622 may be removed from the architecture 600 and the source of the PMOS buffer transistor 622 is coupled to a second positive supply line, labeled as $V_{DD}2$, and an additional positive supply voltage $V_{DD}3$.

Continuing with the embodiment illustrated in FIG. 6, a source and a body terminal of the PMOS buffer transistor 616 are also coupled to an additional NMOS blocking transistor 624. In particular, the body terminal of the PMOS buffer transistor 616 is coupled to a source of the additional NMOS blocking transistor 624 and the source of the PMOS buffer transistor 616 is coupled to a gate, a drain, and a body terminal of the additional NMOS blocking transistor 624. Additionally, a source and a body terminal of the PMOS blocking transistor 622 are coupled to the positive supply line $V_{DD}2$ via a connector 626 and to the additional positive supply voltage $V_{DD}3$ via a connector 628. A gate of the PMOS blocking transistor 622 is coupled to a negative supply line, labeled as $V_{SS}2$, via a connector 630. Further, the drain of the PMOS blocking transistor 622 may be coupled to the drain, gate, and body terminal of the additional NMOS blocking transistor 624.

A source of the NMOS buffer transistor 618 is coupled to a drain of an NMOS blocking transistor 632. The PMOS blocking transistor 622 and the NMOS blocking transistor 632 may each comprise voltage divider devices of blocking circuitry, such as the voltage divider devices 144 of the blocking circuitry 142 of FIG. 1. In addition, a source and a body terminal of the NMOS buffer transistor 618 may be coupled to an additional PMOS blocking transistor 634. In particular, the body terminal of the NMOS buffer transistor 618 is coupled to a source of the additional PMOS blocking transistor 634, while the source of the NMOS buffer transistor 618 is coupled to a gate, a drain, and a body terminal of the additional PMOS blocking transistor 634.

Further, a drain of the NMOS blocking transistor 632 is coupled to the gate, drain, and body terminal of the additional PMOS blocking transistor 634 and a source and a body terminal of the NMOS blocking transistor 632 are coupled to the negative supply line $V_{SS}2$ via the connector 630. The source and the body terminal of the NMOS blocking transistor 632 may also be coupled to a switch 636. The switch 636 may be operable to provide an additional negative supply voltage $V_{SS}3$ to the source and the body terminal of the NMOS blocking transistor 632 via a connector 638. A gate of the NMOS blocking transistor 632 is coupled to the positive supply line $V_{DD}2$ and additional positive supply voltage $V_{DD}3$.

The connector 628 is coupled to the connector 638 and a second clamping circuit 640 may be coupled between the connectors 628, 638. The second clamping circuit 640 may provide ESD protection between the positive supply voltage $V_{DD}3$ and the additional negative supply voltage $V_{SS}3$. The input and the output nodes of the clamping circuit 640 may be coupled to a capacitor 642. In some embodiments, the positive supply voltage $V_{DD}1$, the positive supply line $V_{DD}2$, and/or the additional positive supply voltage $V_{DD}3$ may represent different power domains. In addition, the negative supply voltage $V_{SS}1$, the negative supply line $V_{SS}2$, and/or the additional negative supply voltage $V_{SS}3$ may represent different power domains.

In a particular situation, the switch 636 is closed and the second functional circuit block 620 is turned on. While the switch 636 is closed, the gate of the PMOS blocking transistor 622 is coupled to the additional negative supply voltage $V_{SS}3$ and the gate of the NMOS blocking transistor 632 is coupled to the positive supply line $V_{DD}2$ and the additional positive supply voltage $V_{DD}3$. In these situations, the PMOS blocking transistor 622 and the NMOS blocking transistor 632 are turned on. In this way, any impedance contributed by the PMOS blocking transistor 622 and the NMOS blocking transistor 632 is minimized. Thus, the speed and integrity of the input signal from the first functional circuit block 602 are maintained.

In another scenario, the second functional circuit block 620 is turned off and the switch 636 may be opened in order to reduce leakage current from the second functional circuit block 620. For example, the negative supply line $V_{SS}2$ may float between the additional negative supply voltage $V_{SS}3$ and the voltage of the positive supply line $V_{DD}2$ and/or the additional positive supply voltage $V_{DD}3$ and little or no leakage current from the second functional circuit block 620 will result due to the arrangement of components of the architecture 600. In particular, since no source/drain regions of the PMOS blocking transistor 622 and the blocking NMOS transistor 632 are coupled to receive the input signal from the first functional circuit block 602, the leakage current is prevented from flowing to other portions of the architecture 600 and across power domains, thereby minimizing power consumption.

Furthermore, while the switch 636 is open, an electrostatic discharge event may occur. The electrostatic discharge event may then cause the switch 636 to close, become at least partly conductive, or be in an undefined state. In a particular example, a positive electrostatic discharge event may take place. The positive electrostatic discharge event may include a positive cross-domain ESD stress voltage between the positive supply voltage, $V_{DD}1$ and the negative supply line $V_{SS}2$ when the negative supply line $V_{SS}2$ is grounded. In this example, the additional positive supply voltage $V_{DD}3$ may be pulled to the additional negative supply voltage $V_{SS}3$ by the capacitor 642 or by a suitable low ohmic shunting device of the clamping circuitry 640 that is opened during the ESD event. In this way, the blocking NMOS transistor 632 remains off during the ESD event. Consequently, a voltage divider is formed between the gate and the source of the NMOS buffer transistor 618 and the drain and the source of the NMOS blocking transistor 632. Furthermore, the additional PMOS blocking transistor 634 may be operable to bias the p-wells of the NMOS buffer transistor 618 and the NMOS blocking transistor 632 to provide reverse blocking for any body diodes of the transistors 618, 632 that may open up during the ESD event. The additional PMOS blocking transistor 634 is also operable to provide free floating of the voltage at the node between the source of the NMOS buffer transistor 618 and the drain of the NMOS blocking transistor 632 to enhance the effects of the voltage divider formed between the gate and the source of the NMOS buffer transistor 618 and the drain and the source of the NMOS blocking transistor 632. In this way, the voltage experienced by the gate of the NMOS buffer transistor 618 during the ESD event is reduced and damage to the gate of the NMOS buffer transistor 618 is minimized or eliminated.

In some embodiments, the p-wells of the NMOS transistors 618, 624, and 632 may be isolated from a p-substrate of the semiconductor chip that includes the architecture 600. In some instances, the NMOS transistors 618, 624, and 632 may share a common p-well. Additionally, the PMOS transistors 616, 622, and 634 may share a common n-well. By sharing a common p-well between the NMOS transistors 618, 624, and 632 and a common n-well for the PMOS transistors 616, 622, and 634, the layout area of the interface circuit 614 may be minimized.

Although the embodiment shown in FIG. 6 shows the switch 636 coupled between the NMOS blocking transistor 632 and the additional negative supply voltage, $V_{SS}3$, the switch 636 may be replaced with a short connecting the NMOS blocking transistor 632 directly to the additional negative supply voltage $V_{SS}3$. In this embodiment, the short between the PMOS blocking transistor 622 and the additional positive supply voltage $V_{DD}3$, may be replaced with a switch. Thus, the architecture 600 would be similar to the architecture 300 illustrated in FIG. 3 and operate in a similar manner during normal operation of the architecture 600 and during an ESD event. Continuing with this example, the architecture 600, would also benefit from more balanced voltage division effects between the gate and the source of the PMOS buffer transistor 616 and the drain and the source of the PMOS blocking transistor 622 due to the floating of the voltage between the drain of the PMOS blocking transistor 622 and the source of the PMOS buffer transistor 616 caused by coupling the n-wells of the transistors 616, 622 to the additional NMOS blocking transistor 624. The additional NMOS transistor 624 may also provide reverse blocking of any body diodes that may open up in the transistors 616 and 622 during an ESD event.

Figure 7:
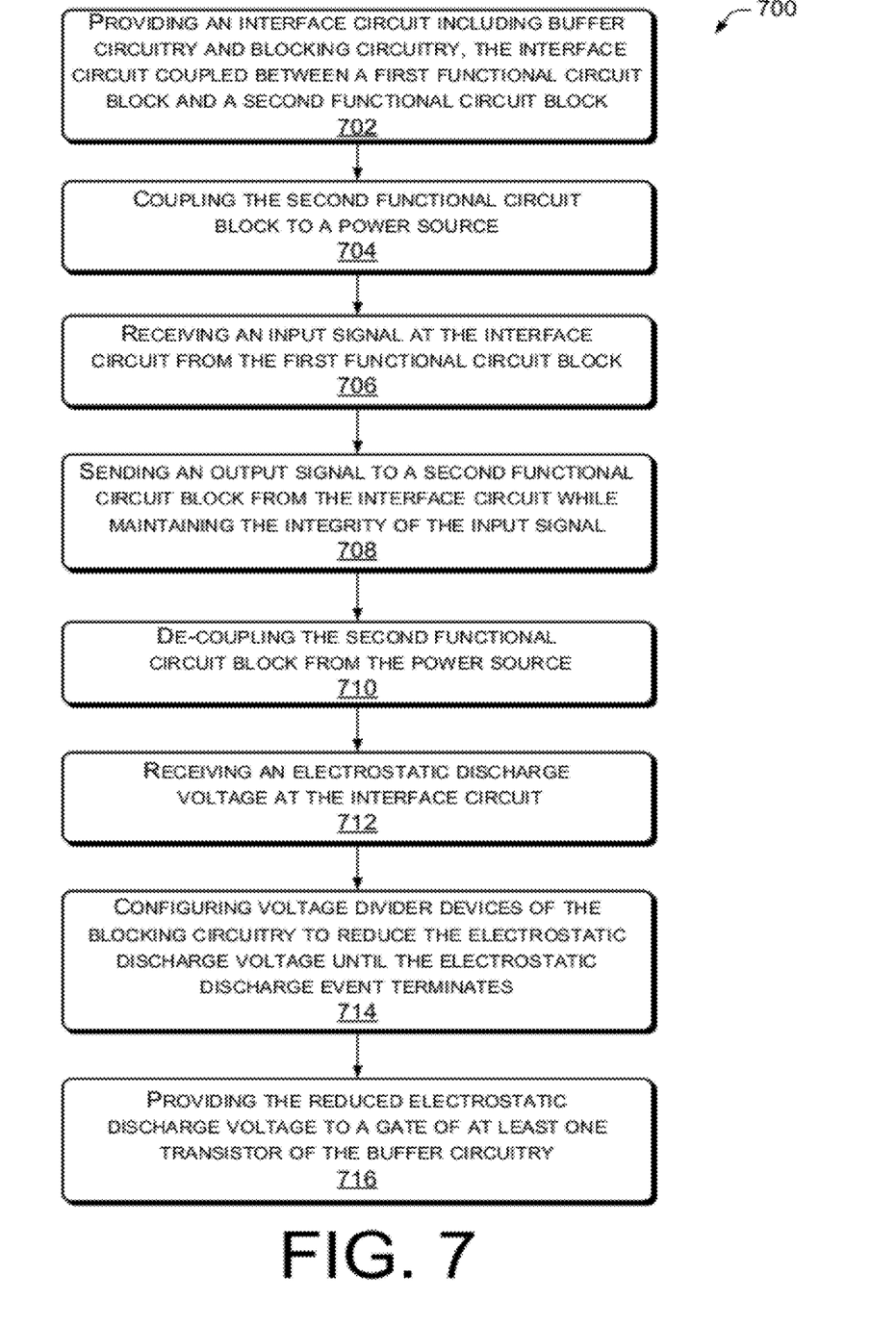
FIG. 7 is a flow diagram of a process to provide protection to buffer circuitry of an interface circuit coupled between functional blocks of a semiconductor chip during an electrostatic discharge event.

FIG. 7 is a flow diagram of a process 700 to provide protection to buffer circuitry of an interface circuit coupled between functional blocks of a semiconductor chip during an electrostatic discharge event. The process 700 is illustrated as a collection of blocks in a logical flow graph, which represent a sequence of operations that can be implemented in hardware. The order in which the operations are described is not intended to be construed as a limitation, and any number of the described blocks can be combined in any order and/or in parallel to implement the process.

At 702, the process 700 includes providing an interface circuit including buffer circuitry and blocking circuitry. The interface circuit may be coupled between a first functional circuit block and a second functional circuit block. Additionally, the buffer circuitry may include at least one MOS buffer transistor and the blocking circuitry may include at least one MOS blocking transistor. In a particular embodiment, the buffer circuitry includes at least one PMOS buffer transistor and/or at least one NMOS buffer transistor and the blocking circuitry includes at least one PMOS blocking transistor and/or at least one NMOS blocking transistor. In some instances, the interface circuit may include circuit arrangements, such as those discussed above with respect to 214 of FIG. 2, 314 of FIG. 3, 416 of FIG. 4, 514 of FIG. 5, and/or 614 of FIG. 6.

At 704, the second functional circuit block is coupled to a power source, such as a supply voltage. At 706, the interface circuit receives an input signal from the first functional circuit block and, at 708, an output signal is sent to a second functional circuit block from the interface circuit. The output signal sent to the second functional circuit block corresponds to the input signal and maintains the integrity of the input signal. For example, the output signal may include the same or similar information as the input signal, the output signal may have a same or similar intensity as the input signal, the output signal may have a same or similar speed as the input signal, the output signal may be inverted with respect to the input signal, or a combination thereof. In a particular embodiment, when the second functional circuit block is coupled to the power source, the MOS transistors of the buffer circuitry and the blocking circuitry may be in an on mode. In this way, the MOS transistors of the blocking circuitry function as low impedance devices, which allows the integrity of the input signal to be maintained. In addition, the input signal and the output signal may be an analog signal or a digital signal.

At 710, the second functional circuit block is de-coupled from a power source, such as at least one negative supply voltage, at least one positive supply voltage, or a combination thereof. In one example, a switch coupling the second functional circuit block to a negative supply voltage may be opened. In another example, a switch coupling the second functional circuit block to a positive supply voltage may be opened. In either case, the second functional circuit block is isolated from a power source and the components of the second functional circuit block are turned off.

At 712, the interface circuit receives an electrostatic discharge voltage while the semiconductor chip may be in an unpowered state. In some cases, the electrostatic discharge voltage may result from a positive electrostatic discharge stress. In other cases, the electrostatic discharge voltage may result from a negative electrostatic discharge stress. Further, the electrostatic discharge stress may span across multiple power domains, such as an electrostatic discharge stress between a negative supply voltage and a positive supply line.

At 714, voltage divider devices of the blocking circuitry are configured in such a way that the electrostatic discharge voltage is reduced until the electrostatic discharge event terminates. The reduced electrostatic discharge voltage may have a value that is lower than the electrostatic discharge voltage. The voltage divider devices may include NMOS blocking transistors and/or the PMOS blocking transistors described above with respect to FIGS. 2-6. In an illustrative example, NMOS blocking transistors or PMOS blocking transistors may be configured to be in an off mode during the electrostatic discharge event and form a voltage divider with NMOS buffer transistors and/or PMOS buffer transistors as explained with respect to FIGS. 2-6.

At 716, the reduced electrostatic discharge voltage is provided to a gate of the at least one PMOS buffer transistor or to a gate of the at least one NMOS buffer transistor. In particular, the reduced electrostatic discharge voltage may be provided to the gate of at least one NMOS buffer transistor, where a value of the modified electrostatic discharge voltage is below a value of a breakdown voltage of the gate of the at least one NMOS buffer transistor. In this way, the gate of the at least one NMOS buffer transistor is preserved during an electrostatic discharge event. Further, when the modified electrostatic discharge voltage is provided to the gate of the at least one PMOS buffer transistor, a value of the modified electrostatic discharge voltage is below a value of a breakdown voltage of the gate of the at least one PMOS buffer transistor. Accordingly, the gate of the at least one PMOS buffer transistor is preserved during an electrostatic discharge event.

For the purposes of this disclosure and the claims that follow, the terms "coupled" and "connected" have been used to describe how various elements interface. Such described interfacing of various elements may be either direct or indirect. Additionally, although features have been described in the illustrative embodiments of FIGS. 1-7 as being connected to a source or drain of the respective MOS transistors, these source or drain connections may be interchanged in other embodiments. Further, although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims. The specific features and acts described in this disclosure and variations of these specific features and acts may be implemented separately or may be combined.

The invention claimed is:

1. A circuit arrangement for electrostatic discharge protection comprising:
 a MOS buffer transistor configured to receive an input signal from a first functional circuit block at a gate of the MOS buffer transistor and to provide at least a portion of an output signal to a second functional circuit block; and
 a MOS blocking transistor coupled to the MOS buffer transistor, wherein a gate of the MOS blocking transistor is coupled to a supply voltage, and wherein a body terminal of the MOS blocking transistor and a body terminal of the MOS buffer transistor are coupled to another blocking transistor.

2. The circuit arrangement of claim 1, wherein at least one of a source or drain of the MOS buffer transistor is coupled to at least one of a source or drain of the MOS blocking transistor.

3. The circuit arrangement of claim 1, wherein the MOS buffer transistor is a PMOS buffer transistor and the MOS blocking transistor is a PMOS blocking transistor, wherein the supply voltage is a negative supply voltage.

4. The circuit arrangement of claim 1, wherein the MOS buffer transistor is a MOS buffer transistor of a first type and the MOS blocking transistor is a MOS blocking transistor of the first type.

5. The circuit arrangement of claim 4, further comprising an additional MOS buffer transistor of a second type configured to receive the input signal from the first functional circuit block at a gate of the additional MOS buffer transistor of the second type and to provide an additional portion of the output signal to the second functional circuit block, wherein at least one of a source or drain of the additional MOS buffer transistor of the second type is coupled to at least one of a source or drain of the MOS buffer transistor of the first type.

6. The circuit arrangement of claim 5, wherein the additional MOS buffer transistor of the second type is coupled to an additional MOS blocking transistor.

7. The circuit arrangement of claim 6, wherein the additional MOS blocking transistor is a MOS blocking transistor of the first type, wherein at least one of a source or drain of the additional MOS blocking transistor of the first type is coupled to at least one of a drain or source of the additional MOS buffer transistor of the second type and a gate of the additional MOS blocking transistor of the first type is coupled to the supply voltage.

8. The circuit arrangement of claim 4, further comprising a switch coupled to at least one of a source or drain of the MOS blocking transistor of the first type.

9. The circuit arrangement of claim 4, wherein at least one of a source or drain of the MOS blocking transistor of the first type is coupled to a supply line, and wherein the supply line is coupled to the second functional circuit block.

10. The circuit arrangement of claim 8, wherein the switch is operable to couple a supply line to an additional supply voltage of a different type.

11. The circuit arrangement of claim 6, wherein the additional MOS blocking transistor is a MOS blocking transistor of the second type, wherein at least one of a drain or source of the additional MOS blocking transistor of the second type is coupled to at least one of a source or drain of the additional MOS buffer transistor of the second type and a gate of the additional MOS blocking transistor of the second type is coupled to a supply line.

12. The circuit arrangement of claim 11, wherein the MOS buffer transistor of the first type and the MOS blocking transistor of the first type are NMOS transistors and the additional MOS buffer transistor of the second type and the additional MOS blocking transistor of the second type are PMOS transistors.

13. The circuit arrangement of claim 3, further comprising a switch coupled to at least a source of the PMOS blocking transistor.

14. The circuit arrangement of claim 3, wherein the at least source of the PMOS blocking transistor is coupled to a positive supply line, and wherein the positive supply line is coupled to the second functional circuit block.

15. The circuit arrangement of claim 13, wherein the switch is operable to couple a positive supply line to a positive supply voltage.

16. The circuit arrangement of claim 1 wherein the supply voltage is coupled to an additional supply voltage of a different type, via a clamping circuit, a capacitor, or a combination thereof.

17. The circuit arrangement of claim 1, wherein a body terminal of the MOS buffer transistor is coupled to at least one of a source or drain of the MOS buffer transistor.

18. The circuit arrangement of claim 1, wherein a body terminal of the MOS blocking transistor is coupled to at least one of a source or drain of the MOS blocking transistor.

19. A computing device including electrostatic discharge protection circuitry comprising:
a first functional circuit block;
a second functional circuit block; and
an interface circuit coupled between the first functional circuit block and the second functional circuit block, the interface circuit comprising:
buffer circuitry including a PMOS buffer transistor and an NMOS buffer transistor, wherein a drain of the NMOS buffer transistor is coupled to a drain of the PMOS buffer transistor; and
blocking circuitry including a PMOS blocking transistor and an NMOS blocking transistor, wherein a drain of the PMOS blocking transistor is coupled to a source of the PMOS buffer transistor and a drain of the NMOS blocking transistor is coupled to a source of the NMOS buffer transistor,
wherein a body terminal of the PMOS blocking transistor and a body terminal of the PMOS buffer transistor are coupled to an additional PMOS blocking transistor, and wherein a body terminal of the NMOS buffer transistor and a body terminal of the NMOS blocking transistor are coupled to an additional NMOS blocking transistor.

20. The computing device of claim 19, wherein a gate of the PMOS blocking transistor is coupled to a first supply voltage and a gate of the NMOS blocking transistor is coupled to a second supply voltage.

21. The computing device of claim 20, wherein the first supply voltage is of a different type than the second supply voltage.

22. The computing device of claim 19, wherein a body terminal and a source of the PMOS buffer transistor are coupled to an additional NMOS blocking transistor, and wherein a body terminal and a source of the NMOS buffer transistor are coupled to an additional PMOS blocking transistor.

23. The computing device of claim 19, further comprising a clamping circuit coupled between the first functional circuit block and the interface circuit, the clamping circuit including at least one NMOS clamping transistor, at least one PMOS clamping transistor, or a combination thereof.

24. A method for electrostatic discharge protection comprising:
providing an interface circuit coupled between a first functional circuit block and a second functional circuit block, the interface circuit including buffer circuitry and blocking circuitry, the buffer circuitry including at least one MOS buffer transistor and the blocking circuitry including at least one MOS blocking transistor;
coupling the second functional circuit block to a power source;
receiving an input signal at the interface circuit from the first functional circuit block;
sending an output signal to the second functional circuit block from the interface circuit, wherein the output signal corresponds to the input signal;
de-coupling the second functional circuit block from the power source;
receiving an electrostatic discharge voltage at the interface circuit;
configuring voltage divider devices of the blocking circuitry to reduce the electrostatic discharge voltage; and
providing the reduced electrostatic discharge voltage to a gate of the at least one MOS buffer transistor,
wherein a body terminal of the MOS blocking transistor and a body terminal of the MOS buffer transistor are coupled to a transistor.

25. The method of claim 24, wherein the configuring of the voltage divider devices of the blocking circuitry to reduce the electrostatic discharge voltage includes configuring the at least one MOS blocking transistor to be in an off-mode during an electrostatic discharge event.

26. The method of claim 24, wherein the configuring of the voltage divider devices of the blocking circuitry to reduce the electrostatic discharge voltage includes configuring the at least one MOS blocking transistor to form a voltage divider with the at least one MOS buffer transistor.

27. The method of claim 24, wherein the reduced electrostatic discharge voltage is provided to the gate of the at least one MOS buffer transistor, a value of the reduced electrostatic discharge voltage being below a value of a breakdown voltage of the gate of the at least one MOS buffer transistor.

28. The method of claim 24, wherein the transistor is a blocking transistor.

* * * * *